United States Patent
Chung et al.

(10) Patent No.: US 9,455,085 B2
(45) Date of Patent: Sep. 27, 2016

(54) MULTILAYER CERAMIC DEVICE HAVING A CRACK GUIDE PATTERN

(71) Applicant: SAMSUNG ELECTRO-MECHANICS CO., LTD., Suwon (KR)

(72) Inventors: Hae Sock Chung, Suwon (KR); Doo Young Kim, Suwon (KR); Na Rim Ha, Suwon (KR); Chang Hoon Kim, Yongin (KR); Sang Hyun Park, Suwon (KR)

(73) Assignee: SAMSUNG ELECTRO-MECHANICS CO., LTD, Suwon-Si, Gyeonggi-Do (KR)

( * ) Notice: Subject to any disclaimer, the term of this patent is extended or adjusted under 35 U.S.C. 154(b) by 73 days.

(21) Appl. No.: 14/175,129

(22) Filed: Feb. 7, 2014

(65) Prior Publication Data

US 2014/0226255 A1 Aug. 14, 2014

(30) Foreign Application Priority Data

Feb. 13, 2013 (KR) .......... 10-2013-0015427

(51) Int. Cl.
*H01G 4/002* (2006.01)
*H01G 4/30* (2006.01)
(Continued)

(52) U.S. Cl.
CPC ............. *H01G 4/002* (2013.01); *C23C 8/12* (2013.01); *H01G 4/008* (2013.01); *H01G 4/012* (2013.01); *H01G 4/12* (2013.01); *H01G 4/30* (2013.01); *H01G 4/306* (2013.01); *H01G 13/00* (2013.01)

(58) Field of Classification Search
CPC ........ H01G 4/002; H01G 4/012; H01G 4/30; H01G 4/12
See application file for complete search history.

(56) References Cited

U.S. PATENT DOCUMENTS 4,241,378 A * 12/1980 Dorrian ............... H01G 4/0085
264/615
5,097,391 A * 3/1992 Nomura et al. .......... 361/321.4
(Continued)

FOREIGN PATENT DOCUMENTS

CN 1674175 A 9/2005
JP 61144813 A * 7/1986
(Continued)

OTHER PUBLICATIONS

Office Action dated Feb. 23, 2016 for U.S. Appl. No. 14/981,083, filed Dec. 28, 2015.
(Continued)

*Primary Examiner* — David M Sinclair
(74) *Attorney, Agent, or Firm* — McDermott Will & Emery LLP

(57) ABSTRACT

Disclosed herein is a multilayer ceramic device. The multilayer ceramic device according to an exemplary embodiment of the present invention includes: a device body having sides which are spaced apart from each other and a circumferential surface which connects the sides; an internal electrode disposed in a longitudinal direction of the device body within the device body; an external electrode having a front part which covers the sides and a band part which extends from the front part to cover a portion of the circumferential surface; and a crack guide pattern disposed within the device body and guiding a progress direction of cracks occurring at the circumferential surface to the sides, wherein the crack guide pattern includes: a metal pattern; and an oxide layer formed on a surface of the metal pattern.

8 Claims, 2 Drawing Sheets

(51) Int. Cl.
*H01G 4/012* (2006.01)
*H01G 13/00* (2013.01)
*H01G 4/12* (2006.01)
*C23C 8/12* (2006.01)
*H01G 4/008* (2006.01)

(56) References Cited

U.S. PATENT DOCUMENTS

| | | | |
|---|---|---|---|
| 5,835,339 A * | 11/1998 | Sakamoto et al. | 361/321.2 |
| 7,042,706 B2 * | 5/2006 | Nagai et al. | 361/305 |
| 7,324,324 B2 * | 1/2008 | Sugimoto et al. | 361/303 |
| 2005/0214517 A1 | 9/2005 | Sugimoto et al. | |
| 2008/0165468 A1* | 7/2008 | Berolini et al. | 361/306.3 |
| 2010/0091429 A1* | 4/2010 | Koga et al. | 361/321.2 |
| 2010/0271752 A1* | 10/2010 | Ishida et al. | 361/303 |
| 2011/0002082 A1* | 1/2011 | Bultitude et al. | 361/306.3 |
| 2011/0075318 A1* | 3/2011 | Suzuki et al. | 361/303 |

FOREIGN PATENT DOCUMENTS

| | | | |
|---|---|---|---|
| JP | 04302118 A | * | 10/1992 |
| JP | 2000353636 A | * | 12/2000 |
| JP | 2002015941 A | * | 1/2002 |
| JP | 2005-252104 | | 9/2005 |
| JP | 2009-224569 | | 10/2009 |
| JP | 2013149806 A | * | 8/2013 |
| KR | 10-2006-0047733 | | 5/2006 |
| KR | 10-2007-0014052 | | 1/2007 |
| WO | WO/ 2010/045540 | | 4/2010 |

OTHER PUBLICATIONS

Chinese Office Action dated Mar. 24, 2016, issued in Chinese Patent Application 201410032169.5 (with English translation).

* cited by examiner

MULTILAYER CERAMIC DEVICE HAVING A CRACK GUIDE PATTERN

This application claims the foreign priority benefit under 35 U.S.C. Section 119 of Korean Patent Application Serial No. 10-2013-0015427 entitled "Multilayer Ceramic Device And Method For Manufacturing The Same" filed on Feb. 13, 2013, which is hereby incorporated by reference in its entirety into this application.

BACKGROUND OF THE INVENTION

1. Technical Field

The present invention relates to a multilayer ceramic device and a method for manufacturing the same, and more particularly, to a multilayer ceramic device capable of preventing a function of a device from deteriorating due to occurrence of crack, and a method for manufacturing the same.

2. Description of the Related Art

A chip component, such as a general thin film type multilayer ceramic condenser (MLCC) is configured of a device body, an internal electrode, an external electrode, and the like. The device body has a stacked structure of a plurality of dielectric sheets called a green sheet and the internal electrode is provided to each of the dielectric sheets. Further, the external electrode has a structure covering both ends outside the device body while being electrically connected to the internal electrode.

A general multilayer ceramic device is designed to focus on improvement of device characteristics, and therefore has a structure which is relatively vulnerable to a physical pressure or impact, a thermal impact, other vibrations, and the like. Therefore, when the physical or thermal impact is applied to the multilayer ceramic device, cracks occur in the device body. When the cracks mainly start from a surface of the device body which is adjacent to an end of the external electrode and then progress to an inside of the device body and the cracks progress to an active region within the device body, the multilayer ceramic device is no longer difficult to perform a function as a device.

In order to prevent the chip component from being damaged due to the crack, there is a technology of allowing the external electrode to have a structure which may absorb the external impact. To this end, the external electrode may have a structure which includes an internal metal layer directly covering the device body, an external metal layer exposed to the outside, and an intermediate layer interposed between the internal metal layer and the external metal layer. However, since the intermediate layer is made of a mixed material of metal and polymer resin, the polymer resin is thermally decomposed during a reflow or wave soldering process for mounting the chip component to space between the internal metal layer and the intermediate layer, thereby causing an internal void. The void and a delamination phenomenon which are not caused by a driving of an electronic device in which the chip component is mounted but are caused by the chip component itself reduce the function of the chip component.

As another method, there is a method of blocking a progress of cracks by providing a reinforcing pattern within the device body which is adjacent to a point at which the cracks frequently occur. However, in order to apply the reinforcing pattern, the number of stacked patterns within the device body is increased, such that manufacturing cost of the device may be increased and a dielectric thickness may be relatively decreased, thereby making it difficult to implement the high-capacity device.

RELATED ART DOCUMENT

Patent Document (Patent Document 1) Korean Patent Laid-Open Publication No. 10-2006-0047733

SUMMARY OF THE INVENTION

An object of the present invention is to provide a multilayer ceramic device keeping a function even at the time of occurrence of cracks due to an external impact, and a method for manufacturing the same.

According to an exemplary embodiment of the present invention, there is provided a multilayer ceramic device, including: a device body having sides which are spaced apart from each other and a circumferential surface which connects the sides; an internal electrode disposed in a longitudinal direction of the device body within the device body; an external electrode having a front part which covers the sides and a band part which extends from the front part to cover a portion of the circumferential surface; and a crack guide pattern, also known as a dummy pattern, disposed within the device body and guiding a progress direction of cracks occurring at the circumferential surface to the sides, wherein the crack guide pattern may include: a metal pattern; and an oxide layer formed on a surface of the metal pattern.

A thickness of the oxide layer may be 0.760 less than that of the crack guide pattern.

A thickness of the oxide layer may be 0.004 as large as that of the crack guide pattern.

A ratio of a thickness of the oxide layer and a thickness of the crack guide pattern may be larger than 0.004 and smaller than 0.760.

The metal pattern may extend from the side to an inside of the device body and an extending length of the metal pattern may be equal to or longer than that of the band part.

The metal pattern may include nickel (Ni) metal and the oxide layer may be a nickel oxide layer.

The device body may include: an active region in which the internal electrode is disposed; and an inactive region which is a region other than the active region, and a crack preventing pattern may be disposed in the inactive region.

According to another exemplary embodiment of the present invention, there is provided a multilayer ceramic device, including: a device body having an active region and an inactive region; an internal electrode disposed in the active region; an external electrode electrically connected to the internal electrode while covering both ends of the device body; and a crack guide pattern disposed in the inactive region to guide cracks occurring in the inactive region so as to remain in the inactive region, wherein the crack guide pattern may include: a metal pattern; and an oxide layer formed on a surface of the metal pattern.

A thickness of the oxide layer may be 0.760 less than that of the crack guide pattern.

A thickness of the oxide layer may be 0.004 as large as that of the crack guide pattern.

A ratio of a thickness of the oxide layer and a thickness of the crack guide pattern may be larger than 0.004 and smaller than 0.760.

According to still another exemplary embodiment of the present invention, there is provided a method for manufacturing a multilayer ceramic device, including: manufacturing a device body which has sides and a circumferential surface connecting the sides; and manufacturing an external electrode which covers the sides and a portion of the circumferential surface, wherein the manufacturing of the device body may include forming a crack guide pattern disposed within the device body and guiding a progress direction of cracks occurring at the circumferential surface to the sides, and the forming of the crack guide pattern may include: forming a metal pattern; and forming an oxide layer on a surface of the metal pattern.

The forming of the oxide layer may include controlling a thickness of the oxide layer by controlling a supply amount of oxygen gas for controlling a process atmosphere within a firing furnace used during a firing process for manufacturing the multilayer ceramic device.

DESCRIPTION OF THE PREFERRED EMBODIMENTS

Figure 1:
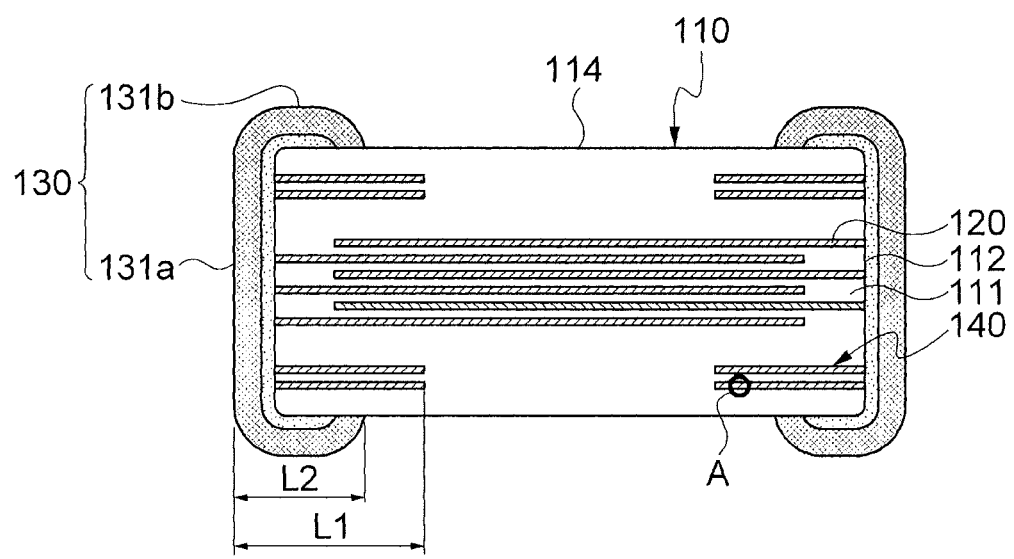
FIG. 1 is a diagram illustrating a multilayer ceramic device according to an exemplary embodiment of the present invention.

Various advantages and features of the present invention and methods accomplishing thereof will become apparent from the following description of embodiments with reference to the accompanying drawings. However, the present invention may be modified in many different forms and it should not be limited to the embodiments set forth herein. Rather, these embodiments may be provided so that this disclosure will be thorough and complete, and will fully convey the scope of the invention to those skilled in the art. Like reference numerals throughout the specification denote like elements.

Terms used in the present specification are for explaining the embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

Further, the exemplary embodiments described in the specification will be described with reference to cross-sectional views and/or plan views that are ideal exemplification figures. In drawings, the thickness of layers and regions is exaggerated for efficient description of technical contents. Therefore, exemplified forms may be changed by manufacturing technologies and/or tolerance. Therefore, the exemplary embodiments of the present invention are not limited to specific forms but may include the change in forms generated according to the manufacturing processes. For example, an etching region vertically shown may be rounded or may have a predetermined curvature.

Hereinafter, a multilayer ceramic device and a method for manufacturing the same according to exemplary embodiments of the present invention will be described in detail with reference to the accompanying drawings.

Figure 2:
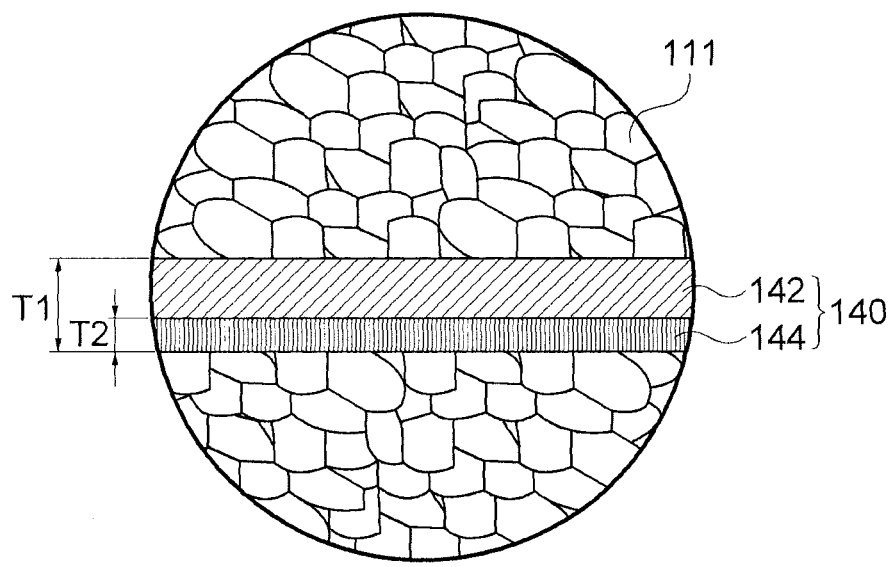
FIG. 2 is an enlarged view of the region A illustrated in FIG. 1.
Figure 3:
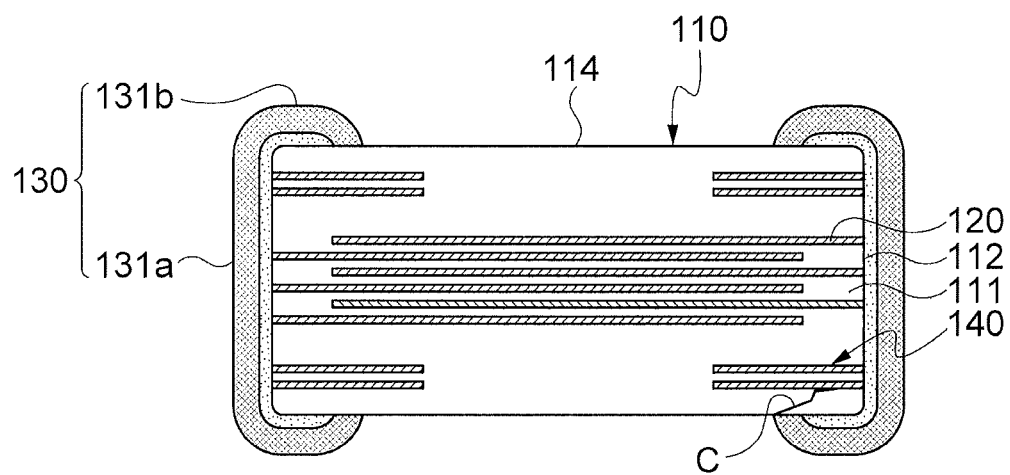
FIG. 3 is a diagram illustrating an appearance which guides a progress direction of cracks of the multilayer ceramic device according to the exemplary embodiment of the present invention.

FIG. 1 is a diagram illustrating a multilayer ceramic device according to an exemplary embodiment of the present invention and FIG. 2 is an enlarged view of the region A illustrated in FIG. 1. FIG. 3 is a diagram illustrating an appearance which guides a progress direction of cracks of the multilayer ceramic device according to the exemplary embodiment of the present invention.

Referring to FIGS. 1 to 3, a multilayer ceramic device 100 according to the exemplary embodiment of the present invention may include a device body 110, an internal electrode 120, an external electrode 130, and a crack guide pattern 140.

The device body 110 may have a multilayer structure in which a plurality of sheets are stacked. As the sheets, dielectric sheets 111 called a green sheet and laminates thereof may generally have a hexahedral shape. Therefore, the device body 110 may have two sides 112 which are spaced apart from each other and four circumferential surfaces 114 which connect the sides 112. The device body 110 may be divided into an active region and an inactive region. The active region is generally positioned at a center in the device body 110 and may be a region in which the internal electrode 120 is positioned. The inactive region, which is a region other than the active region, may be a region in which the internal electrode 120 is not positioned.

The internal electrode 120 may be disposed to be substantially parallel with a longitudinal direction of the device body 110. The internal electrode 120 may be a circuit pattern which is formed on each of the sheets. The internal electrode 120 may be a metal pattern which contacts the external electrode 130. The internal electrode 120 is formed on each of the sheets and may have a structure extending from the side 112 to an inside of the device body 110. Selectively, the internal electrode 120 may further include a floating pattern. The floating pattern may be disposed between the sides 112, without contacting the external electrode 130 within the device body 110.

The external electrode 130 may cover both ends of the device body 110. The external electrode 130 is configured of a front part 131a and a band part 131b, in which the front part 131a covers the side 112 and the band part 131b may cover a portion of the circumferential surface 114 by extending from the front part 131a. The band part 131b may be a bonded portion which bonds the multilayer ceramic device 100 to an external device (not illustrated) such as a circuit board.

The crack guide pattern 140 may guide a progress direction of cracks so as to direct the cracks occurring from the circumferential surface 114 to the side 112 within the inactive region of the device body 110. For example, in the case in which the multilayer ceramic device 100 forms a structure by being mounted in a predetermined electronic device (not illustrated), when impact is applied to the structure, as illustrated in FIG. 3, a crack C may occur in the multilayer ceramic device 100. The crack C, which mainly occurs at a boundary portion between an end of the band part 131b and the circumferential surface 114, may progress to the active region of the device body 110. When the crack C progresses to the active region within the device body 110, defects may occur in the multilayer ceramic device 100. Therefore, the function of the device 100 may be kept by preventing the crack C from progressing to the active region by changing the progress direction of the crack C. The crack guide pattern 140 is to keep the function of the device even when the crack C occurs and may guide the progress direction of the crack C occurring at the circumferential surface 114 to the side 112.

To this end, the crack guide pattern 140 is disposed in the inactive region of the device body 110, such that the crack C may be processed within the inactive region without progressing to the active region. For example, the crack guide pattern 140 may include a metal pattern 142 and an oxide layer 144 which is formed on a surface of the metal pattern 142. The metal pattern 142 may be a pattern made of various metals and the oxide layer 144 may be a metal oxide layer which is formed in the metal pattern 142. The oxide layer 144 may be formed on the surface of the metal pattern 142 during a firing process for manufacturing the multilayer ceramic device 110.

A length L1 (hereinafter, referred to as 'first length') of the crack guide pattern 140 may be equal to or longer than a length L2 (hereinafter, referred to as 'second length') of the band part 131b. When the first length L1 is shorter than the second length L2, the crack guide pattern 140 has a small area which may cope with the crack C, such that the crack C may enter the active region of the device body 110 avoiding the crack guide pattern 140.

Further, the thickness of the oxide layer 144 may be controlled to allow the crack guide pattern 140 to guide the crack C or no longer enter the crack C in the crack guide pattern 140. In more detail, the oxide layer 144 may impart adhesion between the metal pattern 142 and a BaTiO3 layer which is a material of the dielectric sheets 111. When the thickness of the oxide layer 144 is too thin, the adhesion is too weak, such that a delamination phenomenon which separates the metal pattern 142 from the BaTiO3 layer during the manufacturing process of the device 100. On the other hand, when the thickness of the oxide layer 144 is too thick, the adhesion is too large, such that the function of the crack guide pattern 140 may be lost. That is, the cracks progress along a surface direction of the crack guide pattern 140 due to the separation of the crack guide pattern 140 and the BaTiO3 layer, but when the adhesion is too large, it is difficult to obtain the effect. Therefore, the thickness of the oxide layer 144 may be controlled enough to exhibit the proper adhesion so as to allow the crack guide pattern 140 to work while preventing the delamination phenomenon.

Meanwhile, the thickness of the oxide layer 144 may be appropriately set by controlling the firing process conditions of the multilayer ceramic device 100. For example, the firing process of the multilayer ceramic device 100 may be performed by positioning the device body 110 in a heating space and then injecting a predetermined amount of hydrogen gas and oxygen gas. In this case, the gases may be gas for removing carbon containing materials which remain in the dielectric sheets 111. In this case, as a process atmosphere within the firing furnace approaches an oxidizing atmosphere, the thickness of the oxide layer 144 may be increased and compositions of the oxidizing atmosphere may be made by relatively increasing a supply amount of the oxygen gas which is supplied into the firing furnace. Therefore, the thickness of the oxide layer 144 may be controlled by controlling the supply amount of the oxygen gas.

As described above, the multilayer ceramic device 100 according to the exemplary embodiment of the present invention may include the device body 110 in which the internal electrode 120 is formed, the external electrode 130 which covers both ends of the device body 110, and the crack guide pattern 140 which guide the progress direction of the cracks to direct the cracks occurring at the circumferential surface 114 within the device body 110 to the side 112 within the inactive region. In this case, even though the cracks occur in the device body 110, the progress direction of the cracks may be changed to the region other than the active region within the device body 110, such that the function of the multilayer ceramic device 100 may be maintained. According to the exemplary embodiments of the present invention, the multilayer ceramic device and the method for manufacturing the same include the crack guide pattern which guides the progress direction of the cracks to prevent the cracks occurring within the device body from progressing to the active region, thereby preventing the function of the device from deteriorating due to the occurrence of the cracks.

EXAMPLE 500 multilayer ceramic devices having 1 nF capacity of a size 1.6 mm×0.8 mm×0.8 mm were manufactured. In this case, as the crack guide pattern, a nickel metal pattern was formed on a single dielectric sheet which forms a sheet laminate of the device body, during the process of manufacturing a device body. Further, a thickness T2 of the oxide layer to a thickness T1 of the crack guide pattern was controlled by controlling the supply amount of the oxygen gas which is used during the firing process for the device body. A ratio of the thickness T2 of the oxide layer to the thickness T1 of the crack guide pattern means an oxidized degree ($T_2/T_1$) for the nickel metal pattern, in which the oxidized degree ($T_2/T_1$) was controlled as shown in Table 1.

The warpage strength was evaluated by warping 50 samples up to 5 mm at a speed of 1 mm/sec for each condition and then confirming the number of samples guided along the crack guide pattern via a final crack path by an internal destructive polishing analysis (DPA).

The delamination was evaluated by dipping 100 samples in a solder bath kept at approximately 290° C. for 5 seconds for each condition and performing the DPA.

The warpage strength and delaminating evaluations of the samples classified depending on the thickness of the oxide layer were arranged in the following Table 1.

TABLE 1

| No | Oxidized Degree ($T_2/T_1$) | Warpage Strength | Delamination |
|---|---|---|---|
| 1 | 0.002 | 50/50 | 14/500 |
| 2 | 0.004 | 50/50 | 2/500 |
| 3 | 0.005 | 50/50 | 0/500 |
| 4 | 0.007 | 50/50 | 0/500 |
| 5 | 0.010 | 50/50 | 0/500 |
| 6 | 0.080 | 50/50 | 0/500 |
| 7 | 0.200 | 50/50 | 0/500 |
| 8 | 0.500 | 50/50 | 0/500 |
| 9 | 0.750 | 50/50 | 0/500 |
| 10 | 0.760 | 29/50 | 0/500 |
| 11 | 0.810 | 8/50 | 0/500 |
| 12 | 0.830 | 2/50 | 0/500 |

As illustrated in the above Table 1, when the oxidized degree $T_2/T_1$ is less than 0.760, at the time of evaluating the warpage strength evaluation and then performing the DPA, it was confirmed that all the cracks occurring at the circumferential surface of the device body are guided along the crack guide pattern or remain in the crack guide pattern. However, when the oxidized degree $T_2/T_1$ is equal to or more than 0.760, the cracks are not guided by the crack guide pattern and progress to the active region within the samples, such that the number of samples guided along the crack guide pattern may be reduced. Therefore, when the thickness of the oxide layer is 0.760 less than that of a crack occurrence pattern, even though the cracks occur at the circumferential surface of the device body, the moving direction is guided by a crack prevention pattern and is guided to the side of the device body, and as a result, it was confirmed that the function of the device is kept.

Meanwhile, when the oxidized degree $T_2/T_1$ is equal to or less than 0.004, it was confirmed that the function of the crack guide pattern is exhibited, but the separation phenomenon of the dielectric layer and the crack guide pattern occurs. In this case, the device characteristics do not deteriorate due to the cracks, but the defects of the device occur due to the manufacturing process, and therefore the oxidized degree $T_2/T_1$ may be larger than 0.004. Therefore, considering the manufacturing defect, it may be preferable that the thickness of the oxide layer is 0.004 as large as that of the crack guide pattern or 0.760 less than that of the crack guide pattern.

According to the exemplary embodiments of the present invention, the multilayer ceramic device includes the crack guide pattern which guides the progress direction of the cracks to prevent the crack occurring within the device body from progressing to the active region, thereby preventing the function of the device from deteriorating due to the occurrence of the cracks.

According to the exemplary embodiments of the present invention, the method for manufacturing a multilayer ceramic device may manufacture the multilayer ceramic device having the structure which may prevent the function from deteriorating due to the occurrence of the crack, by preventing the cracks from progressing to the active region of the device body even when the cracks occur in the device body.

The present invention has been described in connection with what is presently considered to be practical exemplary embodiments. In addition, the above-mentioned description discloses only the exemplary embodiments of the present invention. Therefore, it is to be appreciated that modifications and alterations may be made by those skilled in the art without departing from the scope of the present invention disclosed in the present specification and an equivalent thereof. The exemplary embodiments described above have been provided to explain the best state in carrying out the present invention. Therefore, they may be carried out in other states known to the field to which the present invention pertains in using other inventions such as the present invention and also be modified in various forms required in specific application fields and usages of the invention. Therefore, it is to be understood that the invention is not limited to the disclosed embodiments. It is to be understood that other embodiments are also included within the spirit and scope of the appended claims.

What is claimed is:

1. A multilayer ceramic device, comprising:
   a device body having sides which are spaced apart from each other and a circumferential surface which connects the sides;
   an internal electrode disposed in a longitudinal direction of the device body within the device body;
   an external electrode having a front part which covers the sides and a band part which extends from the front part to cover a portion of the circumferential surface; and
   a crack guide pattern disposed within the device body and guiding a progress direction of cracks occurring at the circumferential surface to the sides,
   wherein the crack guide pattern includes:
     a metal pattern; and
     an oxide layer formed on a surface of the metal pattern,
   wherein a ratio of a thickness of the oxide layer and a thickness of the crack guide pattern is larger than 0.004 and smaller than 0.760, and
   wherein the metal pattern includes nickel (Ni) metal and the oxide layer is a nickel oxide layer.

2. The multilayer ceramic device according to claim 1, wherein the metal pattern extends from the side to an inside of the device body and an extending length of the metal pattern is equal to or longer than that of the band part.

3. A multilayer ceramic device, comprising:
   a device body having an active region and an inactive region;
   an internal electrode disposed in the active region;
   an external electrode electrically connected to the internal electrode while covering body ends of the device body; and
   a crack guide pattern disposed in the inactive region to guide cracks occurring in the inactive region so as to remain in the inactive region,
   wherein the crack guide pattern includes:
     a metal pattern; and
     an oxide layer formed on a surface of the metal pattern, and
   wherein a ratio of the thickness of the oxide layer and a thickness of the crack guide pattern is larger than 0.004 and smaller than 0.760.

4. A method for manufacturing a multilayer ceramic device, comprising:
   manufacturing a device body which has sides and a circumferential surface connecting the sides; and
   manufacturing an external electrode which covers the sides and a portion of the circumferential surface;
   wherein the manufacturing of the device body includes forming a crack guide pattern disposed within the device body and guiding a progress direction of cracks occurring at the circumferential surface to the sides, and
   wherein the forming of the crack guide pattern includes:
     forming a metal pattern; and
     forming an oxide layer on a surface of the metal pattern,
   wherein a ratio of a thickness of the oxide layer and a thickness of the crack guide pattern is larger than 0.004 and smaller than 0.760, and
   wherein the metal pattern includes nickel (Ni) metal and the oxide layer is a nickel oxide layer.

5. The method according to claim 4, wherein the forming of the oxide layer includes controlling a thickness of the oxide layer by controlling a supply amount of oxygen gas for controlling a process atmosphere within a firing furnace used during a firing process for manufacturing the multilayer ceramic device.

6. A multilayer ceramic device, comprising:
   a device body having sides which are spaced apart from each other and a circumferential surface which connects the sides;
   an internal electrode disposed in a longitudinal direction of the device body within the device body;
   an external electrode which covers the sides and a portion of the circumferential surface; and
   a dummy pattern disposed on at least one side of the internal electrode within the device body, wherein the dummy pattern includes:
a metal pattern; and
an oxide layer formed on a surface of the metal pattern, and
wherein a ratio of a thickness of the oxide layer and a thickness of the dummy pattern is larger than 0.004 and smaller than 0.760.

7. The multilayer ceramic device according to claim 6, wherein the external electrode has a front part which covers the sides and a band part which extends from the front part to cover a portion of the circumferential surface, and
wherein the metal pattern extends from the side to an inside of the device body and an extending length of the metal pattern is equal to or longer than that of the band part.

8. The multilayer ceramic device according to claim 6, wherein the metal pattern includes nickel (Ni) metal and the oxide layer is a nickel oxide layer.

* * * * *